(12) United States Patent
Igarashi et al.

(10) Patent No.: US 12,119,869 B2
(45) Date of Patent: Oct. 15, 2024

(54) OPTICAL AMPLIFICATION ESTIMATION METHOD, OPTICAL AMPLIFICATION ESTIMATION APPARATUS AND COMPUTER PROGRAM

(71) Applicant: NIPPON TELEGRAPH AND TELEPHONE CORPORATION, Tokyo (JP)

(72) Inventors: Ryo Igarashi, Musashino (JP); Masamichi Fujiwara, Musashino (JP); Takuya Kanai, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 46 days.

(21) Appl. No.: 17/927,056

(22) PCT Filed: May 28, 2020

(86) PCT No.: PCT/JP2020/021142
§ 371 (c)(1),
(2) Date: Nov. 22, 2022

(87) PCT Pub. No.: WO2021/240730
PCT Pub. Date: Dec. 2, 2021

(65) Prior Publication Data
US 2023/0224034 A1  Jul. 13, 2023

(51) Int. Cl.
*H04B 10/079* (2013.01)

(52) U.S. Cl.
CPC ... *H04B 10/07955* (2013.01); *H04B 10/0797* (2013.01)

(58) Field of Classification Search
None
See application file for complete search history.

(56) References Cited

U.S. PATENT DOCUMENTS

2002/0140927 A1* 10/2002 Sobe ................ G01M 11/3154
356/73.1
2008/0089692 A1* 4/2008 Sorin ................ H04J 14/02
398/135

FOREIGN PATENT DOCUMENTS

JP  2002-296145 A  10/2002

OTHER PUBLICATIONS

Ryo Igarashi et al., "Raman Amplification Based 40 km Reach 10G-EPON for Consolidation on the Central Office Building", OECC/PSC 2019, TuA3-3, 2019.

* cited by examiner

*Primary Examiner* — David W Lambert

(57) ABSTRACT

An optical amplification estimation method includes by an excitation light output unit connected to a first end of a first optical transmission line, making excitation light incident on the first optical transmission line, by a monitoring unit connected to the same side as the first end of the first optical transmission line, making monitoring light incident on the first optical transmission line, the monitoring light having a wavelength different from a wavelength of the excitation light, by the monitoring unit, measuring intensity of light incident on the monitoring unit when the excitation light is incident, and intensity of light incident on the monitoring unit when the excitation light is not incident, and by an amplification estimation unit, estimating a gain of an optical signal in the first optical transmission line based on the light intensity measured in the measuring. The first optical transmission line shares a partial optical transmission line with a second optical transmission line used for an optical network unit and an optical line terminal to transmit and receive an optical signal to and from each other.

7 Claims, 13 Drawing Sheets

OPTICAL AMPLIFICATION ESTIMATION METHOD, OPTICAL AMPLIFICATION ESTIMATION APPARATUS AND COMPUTER PROGRAM

CROSS-REFERENCE TO RELATED APPLICATIONS

This application is a 371 U.S. National Phase of International Application No. PCT/JP2020/021142, filed on May 28, 2020. The entire disclosure of the above application is incorporated herein by reference.

TECHNICAL FIELD

The present disclosure relates to an optical amplification estimation method, an optical amplification estimation apparatus and a computer program.

BACKGROUND ART

Passive optical network (PON) systems are widely used in optical communication systems. FIG. 12 is a diagram illustrating a configuration example of an optical communication system 90 into which a PON system is adopted.

The optical communication system 90 has a system configuration in which a transmission/reception device disposed in a station building 910 and a transmission/reception device of each of a plurality of subscribers are coupled to each other by one optical transmission line 950 via an optical splitter 940. For example, the transmission/reception device disposed in the station building 910 is an optical line terminal (OLT) 911, and the transmission/reception device of each subscriber is an optical network unit (ONU) 930. The OLT 911 and the ONU 930 transmit and receive signals via the optical transmission line 950 and the optical splitter 940. The signal from the OLT 911 to the ONU 930 is a downlink signal and the signal from the ONU 930 to the OLT 911 is an uplink signal.

The optical communication system has a disadvantage that an optical transmission line loss is increased by extending the optical transmission line. In addition, it will be difficult to secure workers for maintenance of the system in the future. Thus, a technique for compensating for an optical transmission line loss is required without installation of a new station building.

One method for solving this problem is a technique using distributed Raman amplification (NPL 1). FIG. 13 is a diagram illustrating a configuration example of an optical communication system 90 using distributed Raman amplification. In FIG. 13, the same components as those of the optical communication system illustrated in FIG. 12 are denoted by the same reference signs.

The OLT 911 and the ONU 930 transmit and receive signals via a wavelength multiplexer/demultiplexer 913, an OLT optical transmission line 951, a wavelength multiplexer/demultiplexer 960, an ONU optical transmission line 952, and an optical splitter 940. An excitation light output unit 912 is disposed in the station building 910. The wavelength multiplexer/demultiplexer 913 makes the excitation light output from the excitation light output unit 912 incident on the OLT optical transmission line 951. As a result, backward excitation occurs in the OLT optical transmission line 951, and the uplink signal is subjected to distributed Raman amplification.

The wavelength multiplexer/demultiplexer 960 is disposed between the OLT optical transmission line 951 and the ONU optical transmission line 952. The wavelength multiplexer/demultiplexer 960 extracts the excitation light transmitted by the OLT optical transmission line 951 and outputs the extracted excitation light to a terminator 961.

The terminator 961 terminates the acquired excitation light.

CITATION LIST

Non Patent Literature

NPL 1: R. Igarashi et al., "Raman Amplification Based 40 km Reach Raman Amplification Based 40 km Reach the Central Office Building", OECC 2019, TuA 3-3, 2019

SUMMARY OF THE INVENTION

Technical Problem

In the distributed Raman amplification technique, the gain may change according to the state of the transmission line used for amplification. Thus, it is necessary to monitor the gain when introducing this method.

The gain in the distributed Raman amplification technique is defined by the difference in intensity of an optical signal when excitation light is incident and when excitation light is not incident. Thus, the gain in the distributed Raman amplification technique can be measured only when the optical signal is transmitted.

Thus, it is not possible to know the gain when the optical signal is not transmitted.

An object of the present disclosure is to provide an optical amplification estimation method, an optical amplification estimation device, and a computer program capable of acquiring a value related to a gain of an optical signal by Raman amplification even when the optical signal is not transmitted.

Means for Solving the Problem

According to an aspect of the present disclosure, there is provided an optical amplification estimation method of estimating a gain of Raman amplification in a first optical transmission line that shares a partial optical transmission line with a second optical transmission line used for a first optical communication device and a second optical communication device to transmit and receive an optical signal to and from each other. The optical amplification estimation method includes, by an excitation light output unit connected to a first end of the first optical transmission line, outputting excitation light and making the excitation light incident on the first optical transmission line, by a monitoring unit connected to the same side as the first end of the first optical transmission line, outputting monitoring light and making the monitoring unit incident on the first optical transmission line, the monitoring light having a wavelength different from a wavelength of the excitation light, by the monitoring unit, measuring intensity of light incident on the monitoring unit when the excitation light is incident, and intensity of light incident on the monitoring unit when the excitation light is not incident, and estimating a gain of an optical signal in the first optical transmission line based on scattered light intensity measured in the measuring.

According to another aspect of the present disclosure, there is provided an optical amplification estimation device that estimates a gain of Raman amplification in a first optical transmission line that shares a partial optical transmission line with a second optical transmission line used for a first optical communication device and a second optical communication device to transmit and receive an optical signal to and from each other. The optical amplification estimation device includes an excitation light incidence unit connected to a first end of the first optical transmission line and makes excitation light incident on the first optical transmission line, a monitoring light incidence unit connected to the same side of the first end of the first optical transmission line and makes monitoring light having a wavelength different from a wavelength of the excitation light incident on the first optical transmission line, a scattered light measurement unit that measures intensity of light incident on the monitoring unit when the excitation light is incident and intensity of light incident on the monitoring unit when the excitation light is not incident, and an amplification estimation unit that estimates amplification of an optical signal in the optical transmission line based on the intensity of scattered light.

According to still another aspect of the present disclosure, there is provided a program for causing a computer to operate as the optical amplification estimation device.

Effects of the Invention

According to the present disclosure, even when an optical signal is not transmitted, it is possible to acquire a value related to a gain of the optical signal by Raman amplification.

DESCRIPTION OF EMBODIMENTS

Hereinafter, embodiments of the present disclosure will be described in detail with reference to the drawings.

First Embodiment

Figure 1:
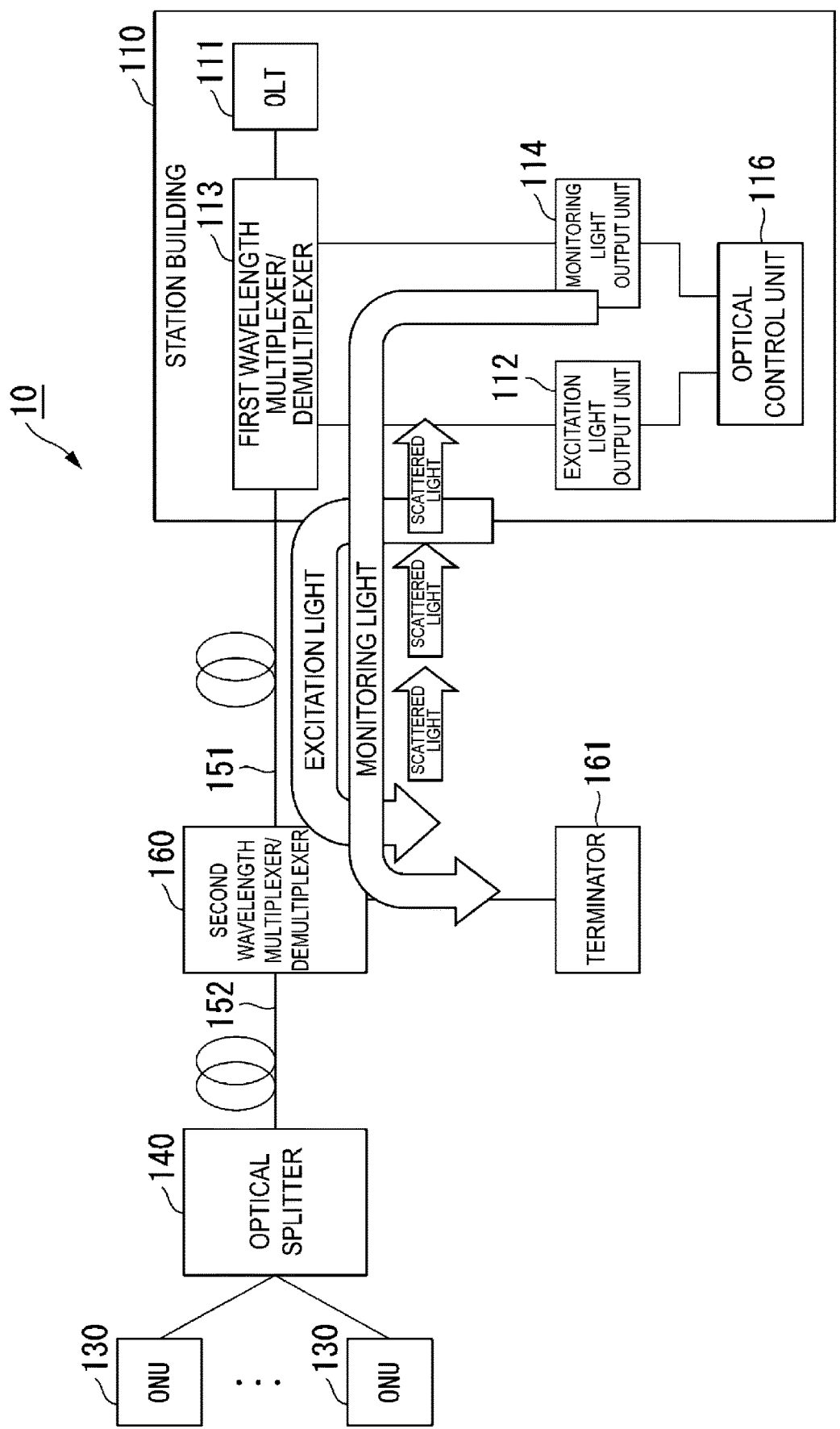
FIG. 1 is a diagram illustrating a configuration of an optical communication system according to a first embodiment.

FIG. 1 is a diagram illustrating a configuration of an optical communication system 10 according to a first embodiment. The optical communication system 10 includes a station building 110, an OLT 111, an excitation light output unit 112, a first wavelength multiplexer/demultiplexer 113, a monitoring light output unit 114, an optical control unit 116, an OLT optical transmission line 151, a second wavelength multiplexer/demultiplexer 160, a terminator 161, an ONU optical transmission line 152, an optical splitter 140, and an ONU 130.

The optical communication system 10 has a system configuration in which the OLT 111 disposed in the station building 110 and a plurality of ONUs 130 are coupled with each other via the OLT optical transmission line 151 and the ONU optical transmission line 152.

The excitation light output unit 112 outputs excitation light to the first wavelength multiplexer/demultiplexer 113.

The monitoring light output unit 114 outputs monitoring light to the first wavelength multiplexer/demultiplexer 113. The monitoring light has a wavelength different from the excitation light and an optical signal. A portion of the monitoring light is scattered by Rayleigh scattering in the optical transmission line, and a portion of the scattered light generated at this time is transmitted in the opposite direction of the traveling direction of the monitoring light and then is incident on the monitoring light output unit 114. The monitoring light output unit 114 detects the incident scattered light. The monitoring light output unit 114 outputs the intensity of the detected scattered light to the optical control unit 116.

The first wavelength multiplexer/demultiplexer 113 multiplexes the excitation light input from the excitation light output unit 112, the monitoring light input from the monitoring light output unit 114, and the optical signal input from the OLT 111, and outputs the resultant light to the OLT optical transmission line 151. In addition, the first wavelength multiplexer/demultiplexer 113 demultiplexes light input from the OLT optical transmission line 151 into rays of light in an excitation light wavelength band, a monitoring light wavelength band, and an optical signal wavelength band, and outputs the respective rays of light to the excitation light output unit 112, the monitoring light output unit 114, and the OLT 111.

The second wavelength multiplexer/demultiplexer 160 multiplexes light input from the terminator 161 and light transmitted from the ONU optical transmission line 152 and outputs the resultant light to the OLT optical transmission line 151. In addition, the second wavelength multiplexer/demultiplexer 160 demultiplexes light transmitted from the OLT optical transmission line 151 into rays of light in the excitation light wavelength band, the monitoring light wavelength band, and the optical signal wavelength band. Then, the second wavelength multiplexer/demultiplexer 160 outputs the rays of light in the excitation light wavelength band and the monitoring light wavelength band to the terminator 161, and outputs the rays of light in the optical signal wavelength band to the ONU optical transmission line 152.

Figure 2:
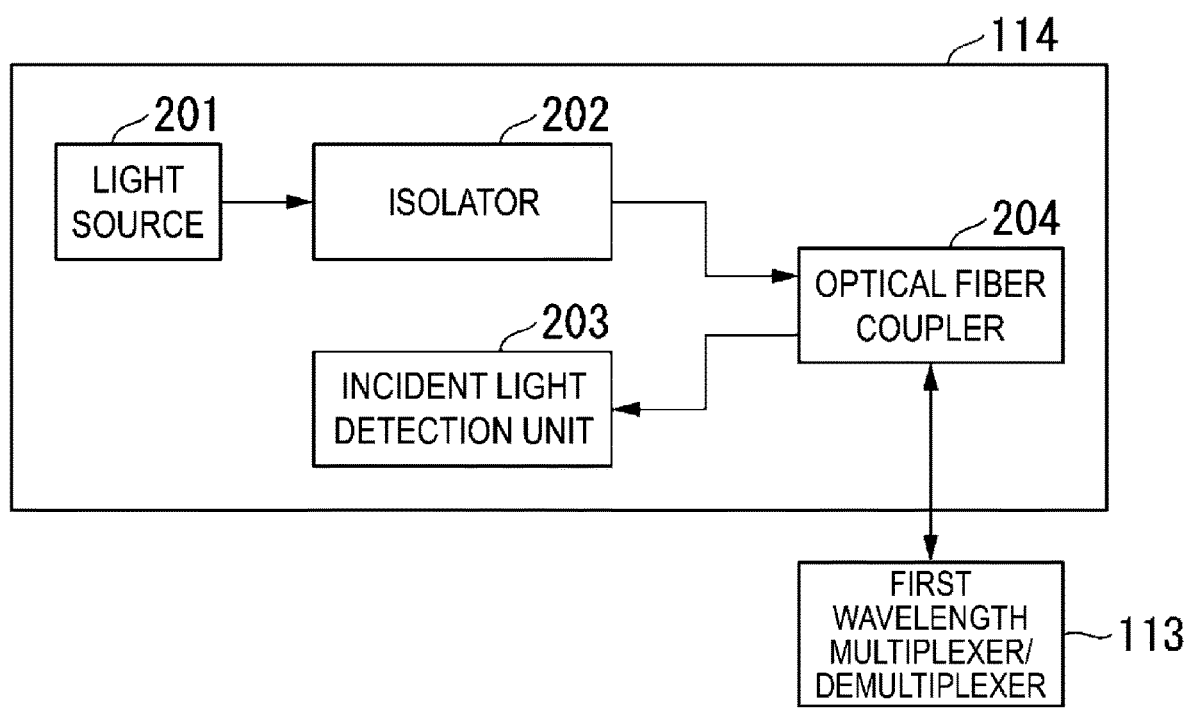
FIG. 2 is a diagram illustrating an example of a configuration of a monitoring light output unit according to the first embodiment.

FIG. 2 is a diagram illustrating an example of a configuration of the monitoring light output unit 114 according to the first embodiment.

A light source 201 outputs monitoring light. Examples of the configuration of the light source 201 include laser diodes and switches. The light source 201 is switched on and off based on output from the optical control unit 116, so that the output of the monitoring light by the laser diode is controlled.

An isolator 202 causes the monitoring light output by the light source 201 to pass through the isolator and blocks light directed toward the light source 201.

An incident light detection unit 203 detects the input light and measures the intensity of the input light. Examples of the incident light detection unit 203 include a photodiode.

An optical fiber coupler 204 is connected to the isolator 202, the incident light detection unit 203, and the first wavelength multiplexer/demultiplexer 113. The optical fiber coupler 204 inputs the monitoring light input from the isolator 202 to the first wavelength multiplexer/demultiplexer 113, and inputs the light input from the first wavelength multiplexer/demultiplexer 113 to the incident light detection unit 203. Specifically, the optical fiber coupler 204 is a 2×2 coupler including two ports at a first end and two ports at a second end. One of the two ports at the first end is connected to the first wavelength multiplexer/demultiplexer 113, and the second end is connected to the isolator 202 and the incident light detection unit 203. The port of the optical fiber coupler 204 at the first end, which is not connected to the first wavelength multiplexer/demultiplexer 113, is terminated. In other embodiments, the monitoring light output unit 114 may include a circulator including three ports instead of the optical fiber coupler 204. The circulator is connected to the light source 201, the incident light detection unit 203, and the first wavelength multiplexer/demultiplexer 113 so as to input the monitoring light input from the light source 201 to the first wavelength multiplexer/demultiplexer 113 and input the light input from the first wavelength multiplexer/demultiplexer 113 to the incident light detection unit 203.

Figure 3:
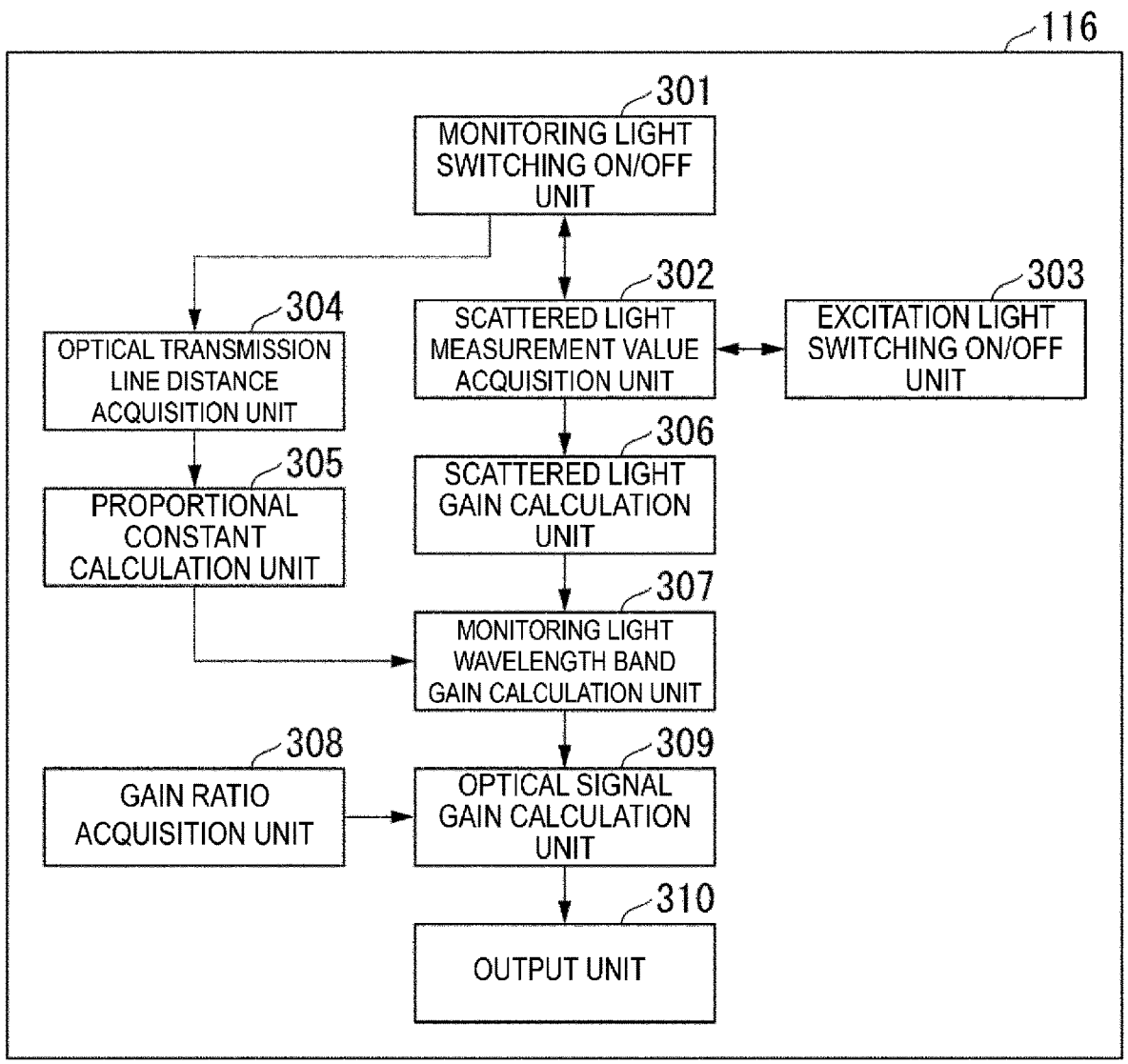
FIG. 3 is a schematic block diagram illustrating a software configuration of an optical control unit according to the first embodiment.

FIG. 3 is a schematic block diagram illustrating a software configuration of the optical control unit 116 according to the first embodiment.

The optical control unit 116 includes a monitoring light switching on/off unit 301, a scattered light measurement value acquisition unit 302, an excitation light switching on/off unit 303, an optical transmission line distance acquisition unit 304, a proportional constant calculation unit 305, a scattered light gain calculation unit 306, a monitoring light wavelength band gain calculation unit 307, a gain ratio acquisition unit 308, an optical signal gain calculation unit 309, and an output unit 310.

The monitoring light switching on/off unit 301 switches on and off the monitoring light output by the monitoring light output unit 114. The scattered light measurement value acquisition unit 302 acquires the intensity value of the scattered light detected by the incident light detection unit 203 in the monitoring light output unit 114. The excitation light switching on/off unit 303 switches on and off the excitation light output by the excitation light output unit 112. The optical transmission line distance acquisition unit 304 acquires the distance of the optical transmission line from an external database, for example. The proportional constant calculation unit 305 calculates a relational expression for a scattered light gain G1 (hereinafter referred to as G1) and a monitoring light wavelength band gain G2 (hereinafter referred to as G2), based on the distance of the optical transmission line.

The scattered light gain calculation unit 306 calculates G1 based on the intensity value of the scattered light, which is acquired by the scattered light measurement value acquisition unit 302. The monitoring light wavelength band gain calculation unit 307 calculates G2 based on G1 calculated by the scattered light gain calculation unit 306 and the relational expression between G1 and G2, which is calculated by the proportional constant calculation unit 305. The gain ratio acquisition unit 308 acquires ratio data representing the ratio between the gain of the monitoring light and the gain of the optical signal, for example, from an external database. The optical signal gain calculation unit 309 calculates an uplink signal gain G3 (hereinafter referred to as G3) based on G2 calculated by the monitoring light wavelength band gain calculation unit 307 and data on the wavelength dependency of the gain. The output unit 310 outputs calculated G3. For example, G3 is output to the external database or a display device that displays the value of G3.

Calculation Method

Next, a method of calculating the gains G1, G2, and G3 according to the first embodiment will be specifically described.

G1 indicates the gain of scattered light. When the intensity of scattered light at the time of outputting excitation light is set as $P_{ON}$, and the intensity of scattered light at the time of not outputting excitation light is set as $P_{OFF}$, G1 can be obtained by Equation (1) as follows.

$$G1 = \frac{P_{ON}}{P_{OFF}} \tag{1}$$

G2 indicates the gain obtained when the monitoring light is transmitted through the same path as the uplink signal. The scattered light can be generated in the entire transmission path, but the uplink signal is unilaterally transmitted from the ONU end to the OLT end, and is not generated from a certain point of the transmission path like the scattered light. Thus, the gains G1 and G2 are not equal to each other. The relation between G1 and G2 is represented by Equation (2) as follows.

[Math. 2]

$$\log(G2) = K \times \log(G1) \tag{2}$$

K in Equation (2) indicates a constant determined by the distance of the optical transmission line. By using this constant, G1 and G2 can be calculated.

Figure 4:
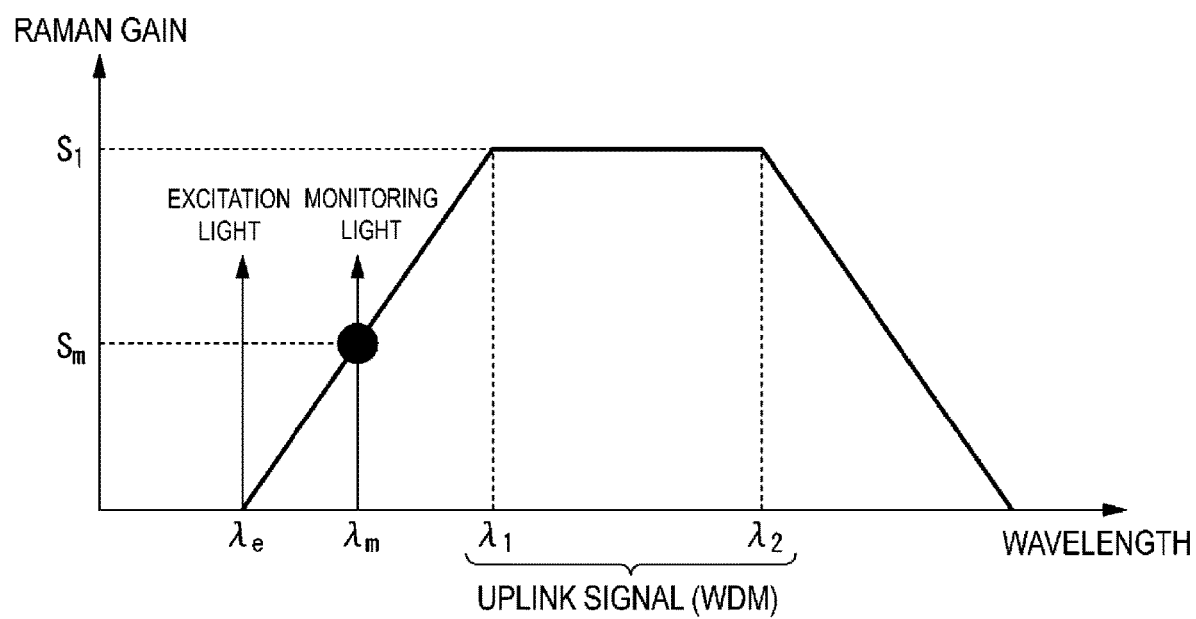
FIG. 4 is a diagram illustrating an example of wavelength dependency of a gain according to the first embodiment.

G3 indicates the gain of uplink signal light. The optical signal, the monitoring light, and the excitation light used in the optical communication have different wavelengths. FIG. 4 is a diagram illustrating an example of wavelength dependency of a Raman gain. Light having a wavelength longer than the wavelength of excitation light is subjected to Raman amplification by the excitation light, but the gain varies according to the wavelength. The gain of the optical signal increases as the wavelength of the amplified optical signal becomes longer than the wavelength $\lambda_c$ of the excitation light. The gain of the optical signal asymptotically approaches a constant value, and the gain of the optical signal becomes substantially constant when the signal has a wavelength equal to or longer than the wavelength $\lambda_1$. On the other hand, when the optical signal has a further longer wavelength and then has a wavelength equal to or longer than the wavelength $\lambda_2$, the gain of the optical signal decreases. In FIG. 4, the gain changes linearly, but the present embodiment is not limited to this. The wavelength $\lambda_m$ of the excitation light is set such that the uplink signal being an optical signal can have the maximum gain.

In the example illustrated in FIG. 4, the wavelength $\lambda_m$ of the monitoring light is set between the wavelengths $\lambda_c$ of the excitation light and $\lambda_1$. That is, the wavelength $\lambda_m$ of the monitoring light is longer than the wavelength $\lambda_c$ of the excitation light and is shorter than the wavelength of the optical signal. A ratio between a gain obtained by light having the wavelength $\lambda_m$ due to the excitation light and a gain obtained by light in a wavelength band from $\lambda_1$ to $\lambda_2$ due to the excitation light is obtained in advance. For example, when the gain obtained by the light having the wavelength $\lambda_m$ due to the excitation light having the wavelength $\lambda_c$ is $S_m$, and the gain obtained by the light having the wavelength band from $\lambda_1$ to $\lambda_2$ is $S_1$, the ratio is $S_m:S_1$. This data is stored in a database or the like.

G3 can be calculated by Equation (3) using the gain G2 of the monitoring light and the ratio data $S_m:S_1$, which is obtained in advance.

$$G3 = G2 \times \frac{S_1}{S_m} \quad (3)$$

The method of calculating the gains G1, G2, and G3 has been described above.

Operation of System

Figure 5:
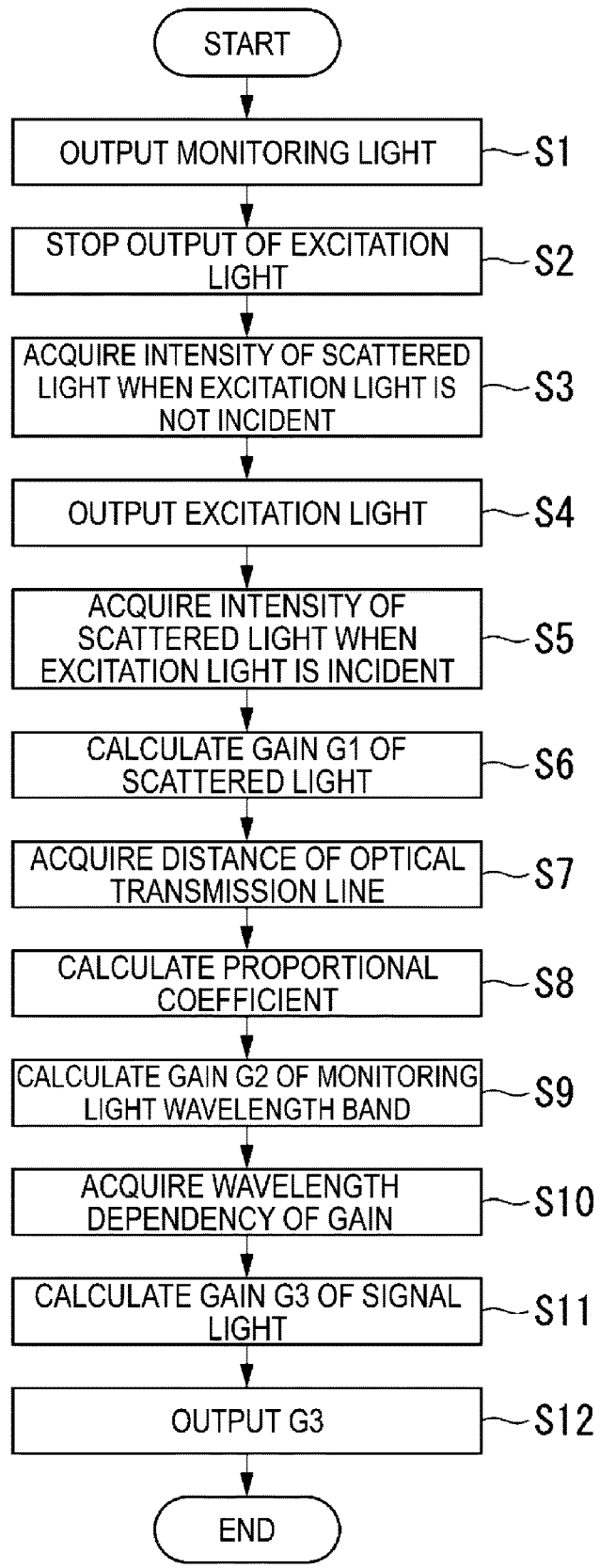
FIG. 5 is a flowchart illustrating an operation of an optical amplification estimation device according to the first embodiment.

FIG. 5 is a flowchart illustrating an operation of the optical amplification estimation device (apparatus) according to the first embodiment.

At a certain timing when an uplink signal is not transmitted through the OLT optical transmission line 151, that is, when communication is not established between the OLT 111 and the ONU 130, the monitoring light switching on/off unit 301 outputs an output instruction of monitoring light to the monitoring light output unit 114. The monitoring light output unit 114 acquires the output instruction and outputs the monitoring light to the first wavelength multiplexer/demultiplexer 113 (Step S1). The excitation light switching on/off unit 303 outputs an output stop instruction of excitation light to the excitation light output unit 112. The excitation light output unit 112 acquires the output stop instruction and stops the output of the excitation light to the first wavelength multiplexer/demultiplexer 113 (Step S2).

When the monitoring light is incident on the OLT optical transmission line 151, the monitoring light is scattered throughout the OLT optical transmission line 151 to generate scattered light. The backscattered light of the scattered light is incident on the monitoring light output unit 114. The monitoring light output unit 114 detects this scattered light and measures the intensity of the detected scattered light. Then, the scattered light measurement value acquisition unit 302 acquires data of the intensity (Step S3). After the data of the scattered light intensity is acquired, the excitation light switching on/off unit 303 outputs an output instruction of the excitation light to the excitation light output unit 112. The excitation light output unit 112 acquires the output instruction and outputs the excitation light to the first wavelength multiplexer/demultiplexer 113 (Step S4). At this time, the monitoring light is scattered to generate scattered light, as in a case where the excitation light is not incident. This scattered light is amplified by the excitation light. The monitoring light output unit detects this scattered light and measures the intensity of the detected scattered light. Then, the scattered light measurement value acquisition unit 302 acquires the data of the intensity (Step S5).

The scattered light gain calculation unit 306 calculates G1 based on the data of the scattered light intensity acquired by the scattered light measurement value acquisition unit 302 (Step S6).

The optical transmission line distance acquisition unit 304 acquires the data of the distance of the OLT optical transmission line 151 (Step S7). The proportional constant calculation unit 305 calculates the relational expression between G2 and G1 based on the distance of the optical transmission line (Step S8). The monitoring light wavelength band gain calculation unit 307 calculates G2 based on G1 calculated by the scattered light gain calculation unit 306 and the relational expression between G2 and G1, which is calculated by the proportional constant calculation unit 305 (Step S9).

The gain ratio acquisition unit 308 acquires data of the dependency between the wavelength and the gain (Step S10). The optical signal gain calculation unit 309 calculates G3 based on G2 and the data of the dependency between the wavelength and the gain (Step S11). Finally, the output unit 310 outputs the value of G3 (Step S12), and the processing ends.

The operations of Step S7 and Step S8 in the flowchart illustrated in FIG. 5 may be performed before the series of operations illustrated in FIG. 5. That is, the relational expression between G2 and G1 may be determined before the series of operations illustrated in FIG. 5.

Actions and Effects

As described above, according to the first embodiment, in the optical communication system, the excitation light output unit connected to the first end of the optical transmission line outputs excitation light and makes the excitation light incident on the optical transmission line. The monitoring unit connected to the same side as the first end of the optical transmission line outputs monitoring light having a wavelength different from the excitation light, and the monitoring light is made incident on the optical transmission line. The intensity of the light incident on the monitoring unit when the excitation light is incident and when the excitation light is not incident is measured, and the gain of the optical signal in the optical transmission line is estimated based on the light intensity. That is, according to the first embodiment, the station building 110 measures the backscattered light of the monitoring light output from the station building 110, thereby the gain of the optical signal is estimated. Thus, it is possible to estimate the gain of the optical signal by Raman amplification even when communication is not established between the OLT 111 and the ONU 130.

Second Embodiment

Figure 6:
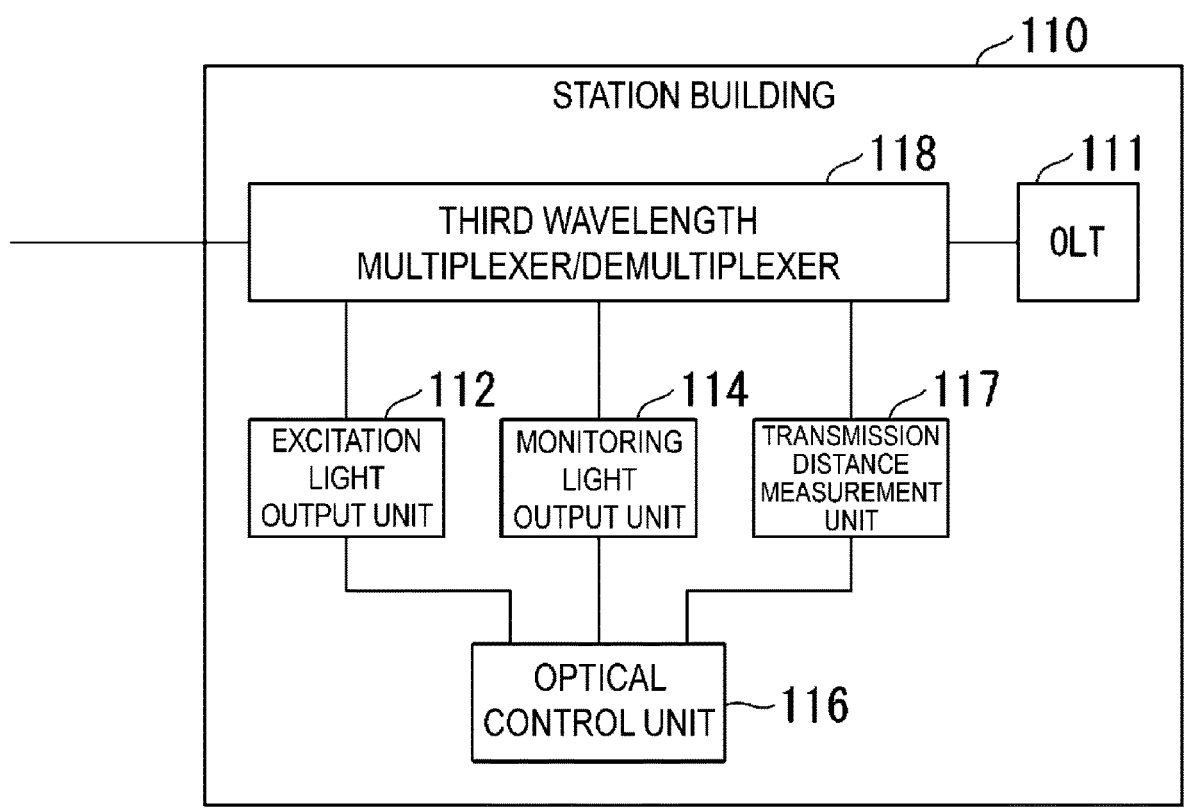
FIG. 6 is a diagram illustrating a configuration of a station building in an optical communication system according to a second embodiment.

FIG. 6 is a diagram illustrating a configuration of a station building 110 in an optical communication system 10 according to a second embodiment. In the optical communication system 10 according to the second embodiment, the station building 110 further includes a transmission distance measurement unit 117 and a third wavelength multiplexer/demultiplexer 118 in addition to the configuration of the optical communication system 10 according to the first embodiment.

The transmission distance measurement unit 117 measures the distance of the OLT optical transmission line 151 in which amplification by excitation light is performed. Examples of the transmission distance measurement unit 117 include an optical time-domain reflectometer (OTDR). When the transmission distance measurement unit 117 is configured by the OTDR, the transmission distance measurement unit 117 outputs an optical pulse to the third wavelength multiplexer/demultiplexer 118. The wavelength of the optical pulse is different from all the wavelengths of the excitation light, the monitoring light, and the optical signal. The transmission distance measurement unit 117 acquires scattered light and reflected light of the optical pulse, and measures the distance of the optical transmission line based on the time series of received light intensity starting from an output timing of the optical pulse.

The third wavelength multiplexer/demultiplexer 118 multiplexes rays of light acquired from the excitation light output unit 112, the monitoring light output unit 114, the transmission distance measurement unit 117, and the OLT 111, and outputs the resultant light to the OLT optical transmission line 151. In addition, the third wavelength multiplexer/demultiplexer 118 demultiplexes light acquired from the OLT optical transmission line 151 into rays of light in the excitation light wavelength band, the monitoring light wavelength band, the optical signal wavelength band and a wavelength band of light output by the transmission distance measurement unit. Then, the third wavelength multiplexer/demultiplexer 118 outputs the respective rays of light to the excitation light output unit 112, the monitoring light output unit 114, the OLT 111, and the transmission distance measurement unit 117. The optical transmission line distance acquisition unit 304 in the optical control unit 116 acquires the distance of the optical transmission line by the transmission distance measurement unit 117.

Figure 7:
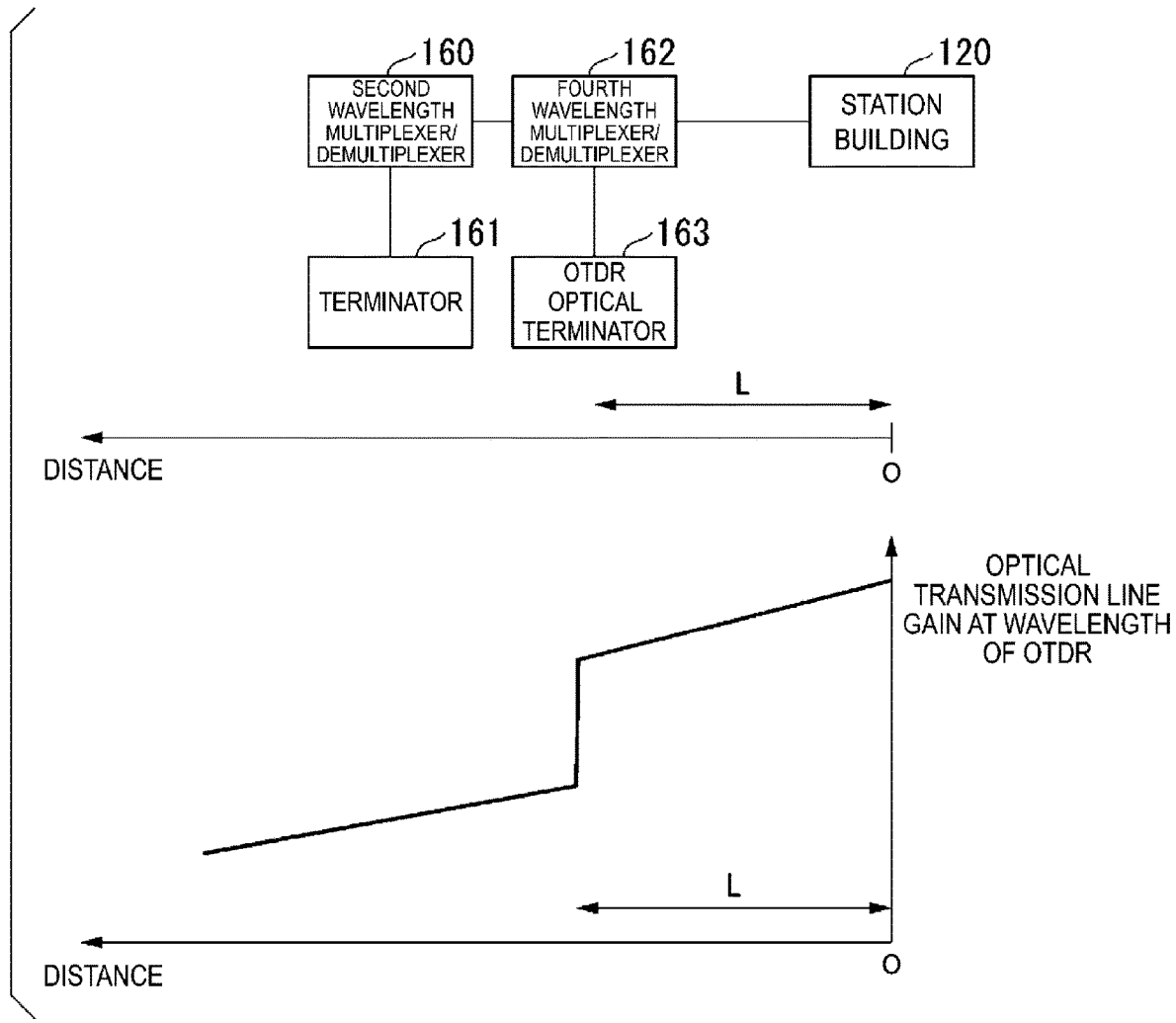
FIG. 7 is a diagram illustrating a partial configuration of the optical communication system according to the second embodiment, and a loss of an optical transmission line of the above configuration.

FIG. 7 is a diagram illustrating a partial configuration of the optical amplification estimation device according to the second embodiment and a loss of the optical transmission line at the wavelength output by the OTDR in the above configuration, the loss being observed by the OTDR. The OTDR is a device capable of outputting an optical pulse to an optical transmission line, and detecting a position at which a loss due to reflection or the like occurs in the optical transmission line, based on the intensity of return light generated as a result of the output optical pulse and the time elapsed until the light returns back. The OTDR can obtain the distance of the optical transmission line by causing this loss at the end point of the optical transmission line. In a case where the distance of the OLT optical transmission line 151 is obtained by using the OTDR, when the wavelength output by the OTDR is demultiplexed by the second wavelength multiplexer/demultiplexer 160 and is terminated by the terminator 161, the loss is observed by the OTDR. Thus, the distance of the OLT optical transmission line 151 can be obtained. Unfortunately, depending on the wavelength output by the OTDR, there is a possibility that the wavelength is demultiplexed by the second wavelength multiplexer/demultiplexer 160 and then output to the ONU optical transmission line 152 along with the optical signal without being output to the terminator. In this case, no loss is observed by the OTDR, and it is not possible to obtain the distance of the OLT optical transmission line 151. Thus, it is preferable that a device that demultiplexes and terminates the wavelength of the light output from the OTDR be provided near the second wavelength multiplexer/demultiplexer 160.

A fourth wavelength multiplexer/demultiplexer 162 demultiplexes the light transmitted from the OLT optical transmission line 151 into light having a wavelength output by the OTDR and light having other wavelengths, i.e., excitation light, monitoring light, and an optical signal. The fourth wavelength multiplexer/demultiplexer 162 outputs the light having the wavelength output by the OTDR to an OTDR optical terminator 163. The light having other wavelengths is output to the second wavelength multiplexer/demultiplexer 160. In addition, the fourth wavelength multiplexer/demultiplexer 162 is installed near the second wavelength multiplexer/demultiplexer 160 in order to measure the distance of the OLT optical transmission line 151. The OTDR optical terminator 163 terminates the input light. The light output by the OTDR is separated from the light transmitted through the OLT optical transmission line 151 and then terminated by the fourth wavelength multiplexer/demultiplexer 162 and the OTDR optical terminator 163. As a result, the loss causing the gain to largely decrease is detected in measurement of the OTDR. The transmission distance measurement unit 117 measures the distance of the OLT optical transmission line 151 based on the time elapsed from when irradiation with the monitoring light starts to when the loss is detected. In FIG. 7, the fourth wavelength multiplexer/demultiplexer 162 is installed between the second wavelength multiplexer/demultiplexer 160 and the station building 110. The fourth wavelength multiplexer/demultiplexer 162 is only required to be installed near the second wavelength multiplexer/demultiplexer 160, and may be installed between the second wavelength multiplexer/demultiplexer 160 and the ONU 130. In this case, the fourth wavelength multiplexer/demultiplexer installed between the second wavelength multiplexer/demultiplexer 160 and the ONU 130 demultiplexes the light output by the second wavelength multiplexer/demultiplexer 160 into an optical signal and light output by the OTDR. In other embodiments, the optical communication system 10 may include an optical splitter instead of the fourth wavelength multiplexer/demultiplexer 162.

Figure 8:
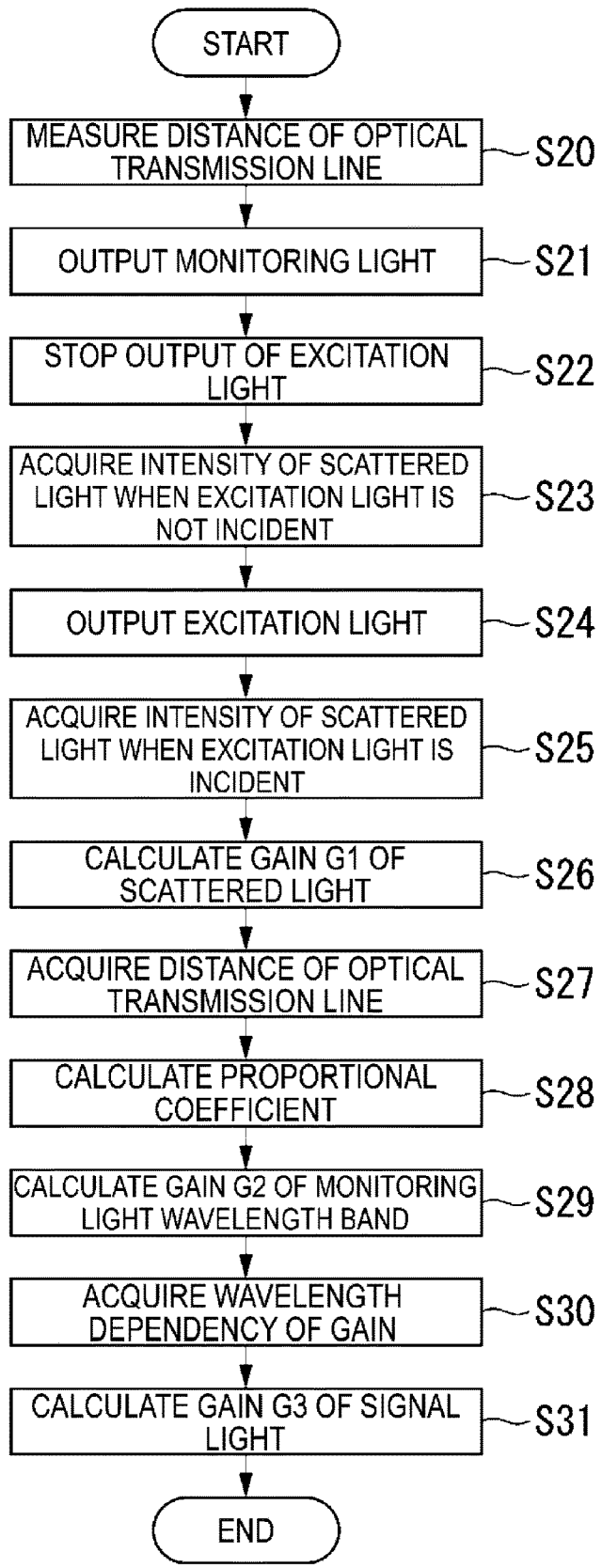
FIG. 8 is a flowchart illustrating an operation of an optical amplification estimation device according to the second embodiment.

FIG. 8 is a flowchart illustrating an operation of the optical amplification estimation device according to the second embodiment.

The transmission distance measurement unit 117 measures the distance of the optical transmission line at a certain timing when an uplink signal is not transmitted through the OLT optical transmission line 151 (Step S20). The subsequent operations from Step S21 to Step S31 are the same as the operations from Step S1 to Step S12 of the flowchart illustrated in FIG. 5 except for Step S27.

In Step S27, the optical transmission line distance acquisition unit 304 acquires the distance of the optical transmission line, which is measured in Step S20 by the transmission distance measurement unit 117 (Step S27).

Actions and Effects

As described above, according to the second embodiment, the optical communication system 10 includes the transmission distance measurement unit 117 that measures the distance of the optical transmission line, and the optical control unit 116 estimates the gain of the optical signal based on the distance of the optical transmission line, which is measured by the transmission distance measurement unit 117. Thus, it is possible to estimate the gain of the optical signal by Raman amplification by measuring the distance of the optical transmission line even when the distance of the optical transmission line is not known in advance.

Third Embodiment

Figure 9:
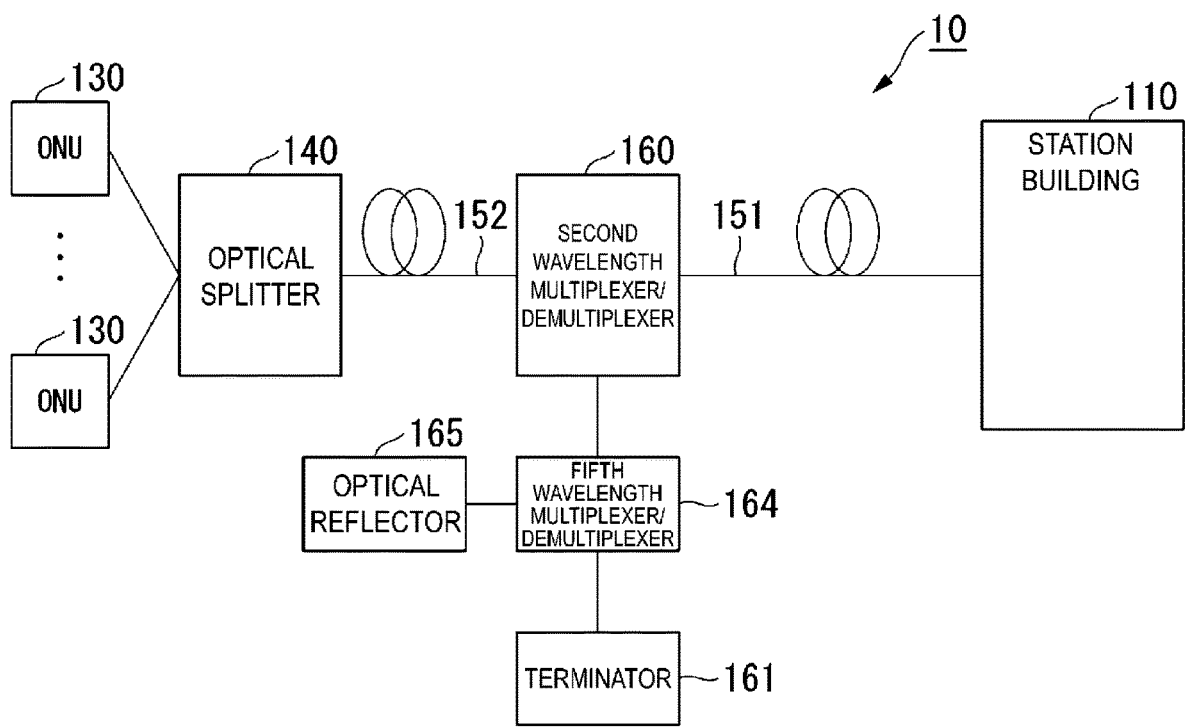
FIG. 9 is a diagram illustrating a configuration of an optical communication system according to a third embodiment.

FIG. 9 is a diagram illustrating a configuration of an optical communication system 10 according to a third embodiment.

The optical communication system 10 according to the third embodiment further includes an optical reflector 165 and a fifth wavelength multiplexer/demultiplexer 164 in addition to the configuration of the optical communication system 10 according to the first embodiment. The fifth wavelength multiplexer/demultiplexer 164 is installed between the second wavelength multiplexer/demultiplexer 160 and the terminator 161, and the optical reflector 165 is connected to the fifth wavelength multiplexer/demultiplexer 164.

The software configuration of the optical control unit 116 according to the third embodiment is different from the software configuration of the optical control unit 116 according to the first embodiment. Specifically, the optical control unit 116 according to the third embodiment includes a reflected light measurement value acquisition unit 402 instead of the scattered light measurement value acquisition unit 302, and does not include the optical transmission line distance acquisition unit 304 or the proportional constant calculation unit 305.

The optical reflector 165 reflects the incident light in an opposite direction of an incident direction. The fifth wavelength multiplexer/demultiplexer 164 demultiplexes the light input from the second wavelength multiplexer/demultiplexer 160 into excitation light and monitoring light. Then, the fifth wavelength multiplexer/demultiplexer 164 outputs light having a wavelength of the excitation light to the terminator and outputs light having a wavelength of the monitoring light to the optical reflector 165. Further, the fifth wavelength multiplexer/demultiplexer 164 multiplexes rays of light input from the optical reflector 165 and the terminator 161 and outputs the resultant light to the second wavelength multiplexer/demultiplexer 160.

Figure 10:
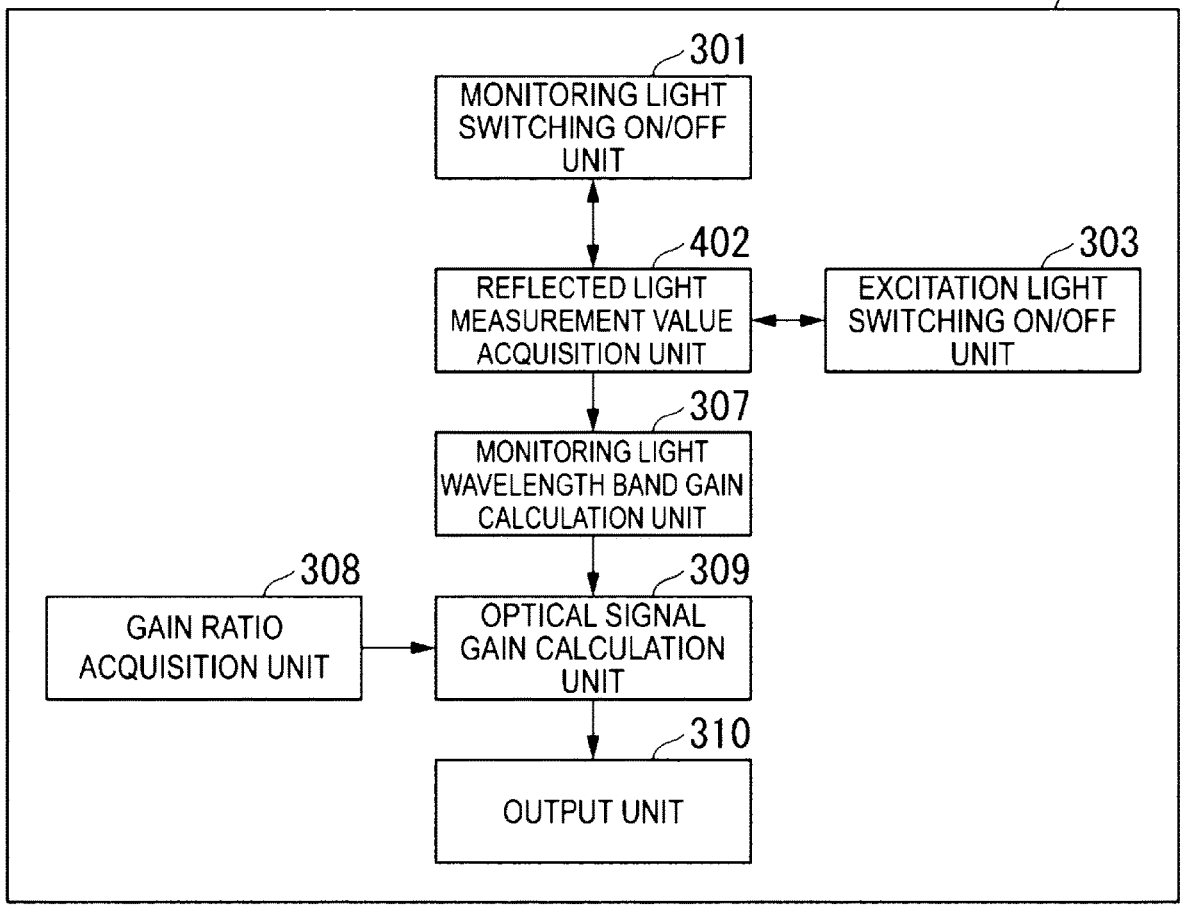
FIG. 10 is a schematic block diagram illustrating a software configuration of an optical control unit according to the third embodiment.

FIG. 10 is a schematic block diagram illustrating a software configuration of an optical control unit 116 according to the third embodiment.

The reflected light measurement value acquisition unit 402 acquires the intensity value of the reflected light detected by the monitoring light output unit 114.

The intensity of the reflected light of the monitoring light is significantly larger than the intensity of the scattered light of the monitoring light. Thus, the incident light detection unit 203 in the monitoring light output unit 114 can identify that the light is reflected light when light stronger than the predetermined intensity is detected. The monitoring light wavelength band gain calculation unit 307 calculates G2 based on the intensity value of the reflected light, which is acquired by the reflected light measurement value acquisition unit 402.

The monitoring light switching on/off unit 301, the excitation light switching on/off unit 303, the gain ratio acquisition unit 308, the optical signal gain calculation unit 309, and the output unit 310 are similar to the monitoring light switching on/off unit 301, the excitation light switching on/off unit 303, the gain ratio acquisition unit 308, the optical signal gain calculation unit 309, and the output unit 310 in the optical control unit 116 according to the first embodiment, respectively.

Calculation Method

Next, a method of calculating the gains G2 and G3 according to the third embodiment will be specifically described.

The gain G2 to be calculated by the optical signal gain calculation unit 309 is the gain obtained when the monitoring light is transmitted in the same path as the uplink signal. The intensity to be measured is the intensity of light after the monitoring light is reciprocally transmitted. Thus, the gain obtained when the monitoring light is reciprocally transmitted is calculated by dividing the intensity of the reflected light when the excitation light is output, by the intensity of the reflected light when the excitation light is not output. The gain of the amplification by excitation light generally changes according to the polarization state of the excitation light and the polarization state of the amplified light. The polarization state of the light transmitted through the optical transmission line varies according to the direction in which the light is transmitted. Thus, regarding the gain obtained when the monitoring light is reciprocally transmitted, the gain in the forward path is different from the gain in the return path.

Here, when, regarding the gain obtained when the monitoring light is reciprocally transmitted, the gain in the forward path is equal to the gain in the return path, it is possible to easily estimate the gain obtained when the monitoring light is transmitted in the same path as the uplink signal.

For example, when the polarization state of the excitation light is a random polarization state, the gains in the forward path and the return path can be set to be equal to each other.

In a case where, regarding the gain obtained when the monitoring light is reciprocally transmitted, the gain in the forward path is set to be equal to the gain in the return path, when the intensity of reflected light when the excitation light is output is denoted as $R_{ON}$, and the intensity of reflected light when the excitation light is not output is denoted as $R_{OFF}$, G2 can be obtained by Equation (4) as follows.

$$G2 = \frac{R_{ON}}{R_{OFF}} \times \frac{1}{2} \quad (4)$$

The gain G3 to be finally obtained is the gain obtained when the optical signal is transmitted through the OLT optical transmission line 151 in one direction. The monitoring light reciprocates through the OLT optical transmission line 151 and receives a gain twice as large as the gain in the case of one-way transmission. Thus, when G2 is calculated by Equation (4), it is necessary that a value obtained by dividing RON by ROFF be multiplied by ½. The method of calculating G3 is similar to the method of calculating G3 according to the first embodiment.

Figure 11:
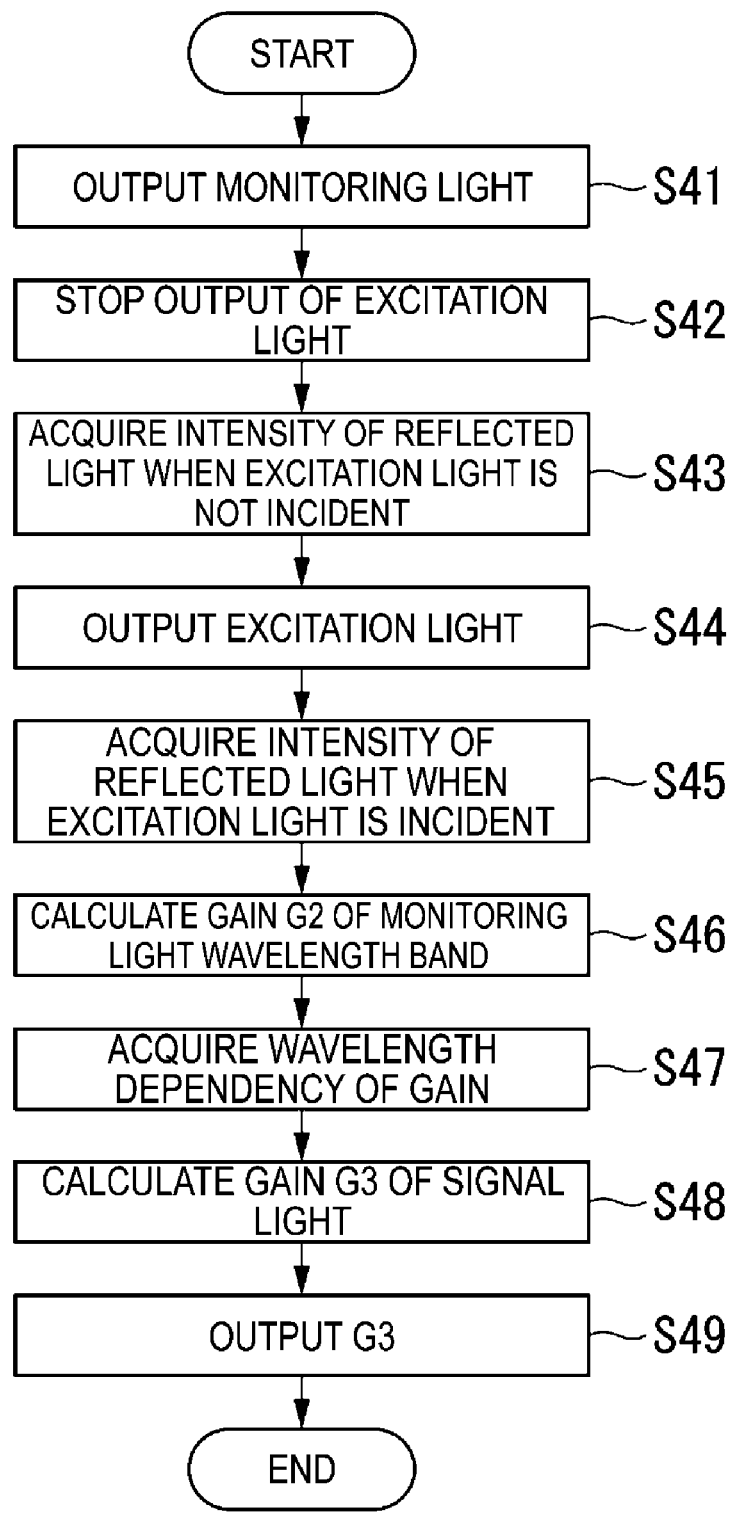
FIG. 11 is a flowchart illustrating an operation of an optical amplification estimation device according to the third embodiment.
Figure 12:
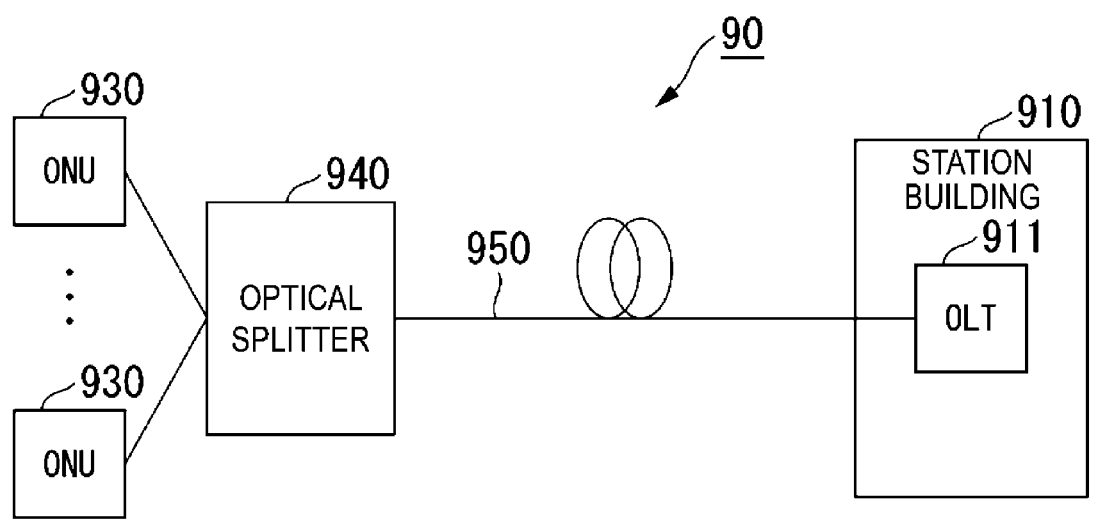
FIG. 12 is a diagram illustrating an example of a configuration of an optical communication system into which a PON system is adopted.
Figure 13:
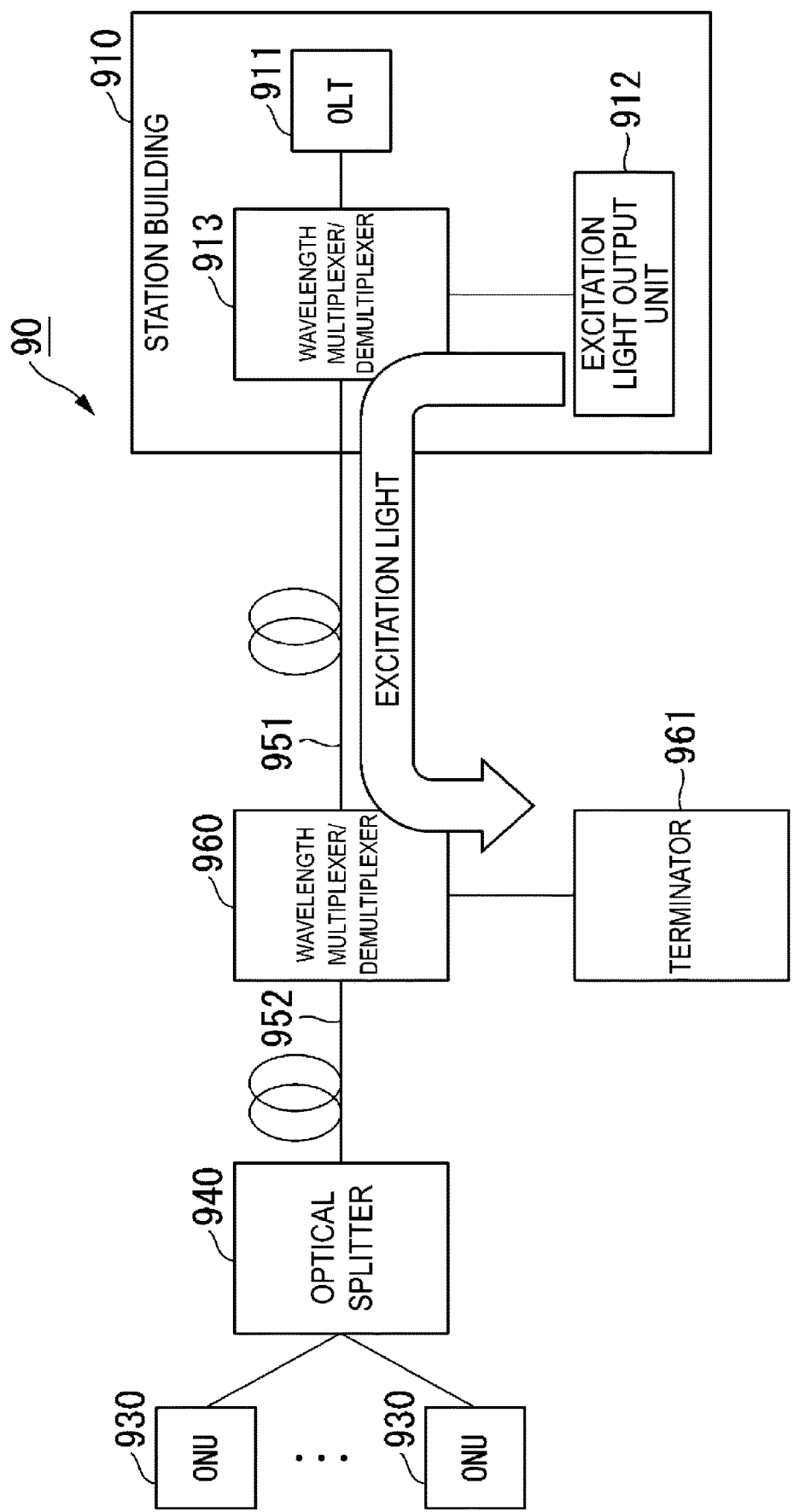
FIG. 13 is a diagram illustrating an example of a configuration of an optical communication system using distributed Raman amplification.

FIG. 11 is a flowchart illustrating an operation of the optical amplification estimation device according to the third embodiment.

First, the monitoring light switching on/off unit 301 outputs an output instruction of monitoring light to the monitoring light output unit 114. The monitoring light output unit 114 acquires the output instruction and outputs the monitoring light to the first wavelength multiplexer/demultiplexer 113 (Step S41). In addition, the excitation light switching on/off unit 303 outputs an output stop instruction of excitation light to the excitation light output unit 112.

The excitation light output unit 112 acquires the output stop instruction and stops the output of the excitation light to the first wavelength multiplexer/demultiplexer 113 (Step S42). At this time, the monitoring light is reflected by the optical reflector 165, and the reflected light is made incident on the monitoring light output unit 114. The monitoring light output unit 114 detects this reflected light and measures the intensity of the detected reflected light. Then, the reflected light measurement value acquisition unit 402 acquires the data of the intensity (Step S43). After the data of the reflected light intensity is acquired, the excitation light switching on/off unit 303 outputs an output instruction of the excitation light to the excitation light output unit 112. The excitation light output unit 112 acquires the output instruction and outputs the excitation light to the first wavelength multiplexer/demultiplexer 113 (Step S44).

At this time, the reflected light is also incident on the monitoring light output unit 114, as in the time when the excitation light is not incident. The monitoring light and the reflected light are amplified by the excitation light. The monitoring light output unit 114 detects this reflected light and measures the intensity of the detected reflected light. Then, the reflected light measurement value acquisition unit 402 acquires the data of the intensity (Step S45). The monitoring light wavelength band gain calculation unit 307 calculates G2 based on the intensity value of the reflected light, which is acquired by the reflected light measurement value acquisition unit 402 (Step S46). A wavelength dependency acquisition unit 408 acquires data of the dependency between the wavelength and the gain (Step S47). The optical signal gain calculation unit 309 calculates G3 based on G2 and the data of the dependency between the wavelength and the gain (Step S48). Finally, the output unit 310 outputs the value of G3 (Step S49), and the processing ends.

Actions and Effects

As described above, according to the third embodiment, the optical communication system 10 includes the optical reflector 165, and the optical reflector 165 reflects the monitoring light output from the monitoring light output unit 114. Then, the monitoring light output unit detects the reflected light, the optical control unit 116 calculates the gain G2, and the optical control unit 116 calculates the gain G3 of the uplink signal based on the value of G2. Thus, it is possible to estimate the gain of the optical signal by Raman amplification even when the scattered light is weak and difficult to be measured.

The optical amplification estimation device includes a central processing unit (CPU), a memory, an auxiliary storage device, and the like which are connected via a bus, and, by executing a program, functions as a device that includes the monitoring light switching on/off unit, the scattered light measurement value acquisition unit, the excitation light switching on/off unit, the optical transmission line distance acquisition unit, the proportional constant calculation unit, the scattered light gain calculation unit, the monitoring light wavelength band gain calculation unit, the gain ratio acquisition unit, the optical signal gain calculation unit, and the output unit. All or some functions of the optical amplification estimation device may be implemented using hardware such as an application specific integrated circuit (ASIC), a programmable logic device (PLD), or a field programmable gate array (FPGA). The program may be recorded on a computer-readable recording medium. The computer-readable recording medium is, for example, a portable medium such as a flexible disk, a magneto-optical disc, a ROM, or a CD-ROM, or a storage device such as a hard disk incorporated in a computer system. The program may be transmitted via an electrical communication line.

OTHER EMBODIMENTS

Hitherto, the embodiments of the present disclosure have been described in detail with reference to the drawings, but the specific configuration is not limited to the above description, and various design changes and the like can be made in a range without departing from the gist of the present disclosure.

REFERENCE SIGNS LIST

10, 90: Optical communication system
110, 910: Station building
111, 911: OLT
112, 912: Excitation light output unit
113: First wavelength multiplexer/demultiplexer
114: Monitoring light output unit
116: Optical control unit
117: Transmission distance measurement unit
118: Third wavelength multiplexer/demultiplexer
130, 930: ONU
140, 940: Optical splitter
151, 951: OLT optical transmission line
152, 952: ONU optical transmission line
160: Second wavelength multiplexer/demultiplexer
161, 961: Terminator
162: Fourth wavelength multiplexer/demultiplexer
163: OTDR optical terminator
164: Fifth wavelength multiplexer/demultiplexer
165: Optical reflector
201: Light source
202: Isolator
203: Incident light detection unit
204: Optical fiber coupler
301: Monitoring light switching on/off unit
302: Scattered light measurement value acquisition unit
303: Excitation light switching on/off unit
304: Optical transmission line distance acquisition unit
305: Proportional constant calculation unit
306: Scattered light gain calculation unit
307: Monitoring light wavelength band gain calculation unit
308: Gain ratio acquisition unit
309: Optical signal gain calculation unit
310: Output unit
402: Reflected light measurement value acquisition unit
913, 960: Wavelength multiplexer/demultiplexer

The invention claimed is:

1. An optical amplification estimation method comprising:
    making, by an excitation light output unit connected to a first end of a first optical transmission line, an excitation light incident on the first optical transmission line;
    making, by a monitoring unit connected to the same side as the first end of the first optical transmission line, a monitoring light incident on the first optical transmission line, the monitoring light has a wavelength different from a wavelength of the excitation light;
    measuring, by the monitoring unit, an intensity of light incident on the monitoring unit when the excitation light is incident, and intensity of light incident on the monitoring unit when the excitation light is not incident;
    estimating, by an amplification estimation unit, a gain of an optical signal in the first optical transmission line based on the light intensity measured in the measuring,
    reflecting, by an optical reflection unit installed on an opposite side of the first end of the first optical transmission line, the incident monitoring light; and
    terminating, by a terminator installed on the opposite side of the first end of the first optical transmission line, the incident excitation light, wherein the first optical transmission line shares a portion of the first optical transmission line with a second optical transmission line used for an optical network unit and an optical line terminal to transmit and receive an optical signal to and from each other.

2. The optical amplification estimation method according to claim 1, wherein the measuring the intensity of light is measuring intensity of scattered light of the monitoring light when the excitation light is incident and intensity of the scattered light of the monitoring light when the excitation light is not incident, and the estimating the gain of the optical signal is the calculating a monitoring light gain at a wavelength of the monitoring light based on the light intensity measured in the measuring and a distance of the first optical transmission line, and estimating the gain of the optical signal based on the monitoring light gain.

3. The optical amplification estimation method according to claim 2, further comprising:

measuring the distance of the first optical transmission line.

4. The optical amplification estimation method according to claim 1, further comprising:

terminating, by a terminator installed on an opposite side of the first end of the first optical transmission line, the incident excitation light and the incident monitoring light.

5. An optical amplification estimation apparatus comprising:

an excitation light output unit connected to a first end of a first optical transmission line and configured to output excitation light to the first optical transmission line;

a monitoring unit connected to the same side as the first end of the first optical transmission line, the monitoring unit being configured to output monitoring light having a wavelength different from a wavelength of the excitation light to the first optical transmission line, an optical reflection unit installed on an opposite side of the first end of the first optical transmission line and configured to reflect the incident monitoring light;

a terminator installed on the opposite side of the first end of the first optical transmission fine and configured to terminate the incident excitation light; and a processor and a memory having computer program instructions stored thereon, wherein the computer program instructions, when executed by the processor, perform to:

measure intensity of light input when the excitation light is output and intensity of light input when the excitation light is not output; and estimate a gain of an optical signal in the first optical transmission line based on the light intensity measured by the computer program instructions, wherein the first optical transmission line shares a portion of the first optical transmission line with a second optical transmission line used for an optical network unit and an optical line terminal to transmit and receive an optical signal to and from each other.

6. The optical amplification estimation apparatus according to claim 5, the computer program instruction further perform to:

estimate the gain of the optical signal based on a distance of the first optical transmission line, the distance of the first optical transmission line being measured.

7. A non-transitory computer-readable medium storing a computer program for causing a computer to execute steps comprising making, by an excitation light output unit connected to a first end of a first optical transmission line, an excitation light incident on the first optical transmission line;

making, by a monitoring unit connected to the same side as the first end of the first optical transmission line, a monitoring light incident on the first optical transmission line, the monitoring light has a wavelength different from a wavelength of the excitation light;

measuring, by the monitoring unit, an intensity of light incident on the monitoring unit when the excitation light is incident, and intensity of light incident on the monitoring unit when the excitation light is not incident; and estimating, by an amplification estimation unit, a gain of an optical signal in the first optical transmission line based on the light intensity measured in the measuring, wherein the first optical transmission line shares a portion of the first optical transmission line with a second optical transmission line used for an optical network unit and an optical line terminal to transmit and receive an optical signal to and from each other, the incident monitoring light is reflected by an optical reflection unit installed on an opposite side of the first end of the first optical transmission line, and the incident excitation light is terminated by a terminator installed on the opposite side of the first end of the first optical transmission line.

\* \* \* \* \*